US012637011B2

(12) United States Patent
Schad et al.

(10) Patent No.: US 12,637,011 B2
(45) Date of Patent: May 26, 2026

(54) MULTIPLE BACKUP CAMERAS FOR REFUSE VEHICLE

(71) Applicant: Oshkosh Corporation, Oshkosh, WI (US)

(72) Inventors: Vince Schad, Oshkosh, WI (US); Andy Cornelius, Oshkosh, WI (US); Nick Weykamp, Oshkosh, WI (US); Quincy Wittman, Oshkosh, WI (US); Jerrod Kappers, Oshkosh, WI (US); Brendan Chan, Oshkosh, WI (US); Eric Olson, Oshkosh, WI (US); Zhenyi Wei, Oshkosh, WI (US); Alec Ehlke, Oshkosh, WI (US); Jeff Meyer, Oshkosh, WI (US); Umang Patel, Oshkosh, WI (US); Austin Mahoney, Oshkosh, WI (US); Thomas Vale, Oshkosh, WI (US); William Young, Oshkosh, WI (US); Johnny Bui, Oshkosh, WI (US); Nagabhushana Sharma Gurumurthy, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 18/917,662

(22) Filed: Oct. 16, 2024

(65) Prior Publication Data

US 2025/0135998 A1 May 1, 2025

Related U.S. Application Data

(60) Provisional application No. 63/593,781, filed on Oct. 27, 2023.

(51) Int. Cl.
| | | |
|---|---|---|
| *B60R 1/26* | (2022.01) | |
| *H04N 7/18* | (2006.01) | |
| *H04N 23/90* | (2023.01) | |

(52) U.S. Cl.
CPC .............. *B60R 1/26* (2022.01); *H04N 7/188* (2013.01); *H04N 23/90* (2023.01);
(Continued)

(58) Field of Classification Search
CPC . B60R 1/26; B60R 2300/20; B60R 2300/105; B60R 2300/303; B60R 2300/802; H04N 23/90; H04N 7/188
See application file for complete search history.

(56) References Cited

U.S. PATENT DOCUMENTS

| | | | | |
|---|---|---|---|---|
| 6,497,547 B1 * | 12/2002 | Maglaras | .................. | B65F 3/28 |
| | | | | 414/525.5 |
| 7,068,289 B2 * | 6/2006 | Satoh | .................... | H04N 7/183 |
| | | | | 348/E7.087 |

(Continued)

*Primary Examiner* — Brian P Yenke
(74) *Attorney, Agent, or Firm* — Foley & Lardner LLP

(57) ABSTRACT

A refuse vehicle includes a chassis, a body coupled to the chassis and defining a refuse compartment, a tailgate pivotally coupled to the body at a rear of the refuse compartment, a first camera coupled to the tailgate at a first location, a second camera coupled to the tailgate at a second location lower than the first location, and a controller. The controller is configured to detect a reverse operation of the refuse vehicle, cause the first camera to capture a first image during the reverse operation when the tailgate is at a closed position, and cause the second camera to capture a second image during the reverse operation when the tailgate is at a fully open position.

20 Claims, 10 Drawing Sheets

(52) U.S. Cl.
CPC ..... *B60R 2300/105* (2013.01); *B60R 2300/20* (2013.01); *B60R 2300/303* (2013.01); *B60R 2300/802* (2013.01)

(56) References Cited

U.S. PATENT DOCUMENTS

| | | | |
|---|---|---|---|
| 9,357,114 B1* | 5/2016 | Whitehead | H04N 23/90 |
| 10,607,092 B2* | 3/2020 | Murad | G06V 20/58 |
| 10,621,445 B2* | 4/2020 | Higgins | B60R 11/04 |
| 11,643,016 B2* | 5/2023 | Sperrle | B60R 1/26 |
| | | | 348/148 |
| 11,766,941 B2* | 9/2023 | Davis | B60L 1/003 |
| | | | 180/65.1 |
| 11,884,215 B2* | 1/2024 | Castro | B60R 1/26 |
| 12,337,763 B2* | 6/2025 | DeSimone | H04N 23/45 |
| 2018/0001820 A1* | 1/2018 | Higgins | B62D 33/0273 |
| 2018/0170261 A1* | 6/2018 | Kaltenmark | H04N 23/63 |
| 2018/0220081 A1* | 8/2018 | Lewis | G06T 11/00 |
| 2018/0220082 A1* | 8/2018 | Lewis | H04N 23/63 |
| 2019/0118729 A1* | 4/2019 | Hartland | B60R 11/04 |
| 2019/0152387 A1* | 5/2019 | Naserian | B60Q 9/00 |
| 2019/0228235 A1* | 7/2019 | Murad | G06V 20/56 |
| 2021/0218934 A1* | 7/2021 | Gorgees | G03B 30/00 |
| 2022/0118854 A1* | 4/2022 | Davis | B60W 10/08 |
| 2022/0212603 A1* | 7/2022 | Castro | B60R 11/04 |
| 2022/0227296 A1* | 7/2022 | Sperrle | G06T 3/4038 |
| 2023/0065657 A1* | 3/2023 | Weston | E05F 15/43 |
| 2023/0082856 A1* | 3/2023 | Lutes | B60R 11/04 |
| | | | 348/148 |
| 2023/0125646 A1* | 4/2023 | Vijaya Kumar | G08G 1/0133 |
| | | | 701/117 |
| 2023/0311772 A1* | 10/2023 | DeSimone | H04N 23/45 |
| | | | 348/148 |
| 2024/0286551 A1* | 8/2024 | Nehls | B60R 1/26 |
| 2024/0336200 A1* | 10/2024 | Baur | B60R 1/26 |
| 2025/0136367 A1* | 5/2025 | Schad | B65F 3/02 |

* cited by examiner

MULTIPLE BACKUP CAMERAS FOR REFUSE VEHICLE

CROSS-REFERENCE TO RELATED PATENT APPLICATION

This application claims the benefit of and priority to U.S. Provisional Patent Application No. 63/593,781, filed Oct. 27, 2023, which is incorporated herein by reference in its entirety.

BACKGROUND

The present disclosure generally relates to the field of refuse vehicles. More specifically, the present disclosure relates to control systems for refuse vehicles that include multiple backup cameras configured to automatically, autonomously, or semi-autonomously capture a target image of the region behind the vehicle.

SUMMARY

One embodiment of a refuse vehicle. The refuse vehicle includes a chassis, a body coupled to the chassis and defining a refuse compartment, a tailgate pivotally coupled to the body at a rear of the refuse compartment, a first camera coupled to the tailgate at a first location, a second camera coupled to the tailgate at a second location lower than the first location, and a controller. The controller is configured to detect a reverse operation of the refuse vehicle, cause the first camera to capture a first image during the reverse operation when the tailgate is at a closed position, and cause the second camera to capture a second image during the reverse operation when the tailgate is at a fully open position.

Another embodiment relates to a refuse vehicle system. The refuse vehicle system includes a first camera configured to couple to a tailgate of a refuse vehicle at a first location, a second camera configured to couple to the tailgate at a second location lower than the first location, and a non-transitory computer-readable medium having instructions stored thereon. The instruction, when executed by one or more processors, cause the one or more processors to detect a reverse operation of the refuse vehicle and cause (a) the first camera to capture a first image during the reverse operation when the tailgate is at a closed position and (b) the second camera to capture a second image during the reverse operation when the tailgate is at a fully open position.

Still another embodiment relates to a refuse vehicle. The refuse vehicle includes a chassis, a body coupled to the chassis, the body defining a refuse compartment, a tailgate pivotally coupled to the body at a rear of the refuse compartment, a first camera coupled to the tailgate at a first location, a second camera coupled to the tailgate at a second location lower than the first location, and a controller. The controller is configured to activate the first camera to acquire first image data during a reverse operation of the refuse vehicle when the tailgate is at a closed position, generate an image for display based on the first image data, activate the second camera to acquire second image data during the reverse operation as the tailgate is pivoting open from the closed position, generate the image based on the first image data and the second image data, deactivate the first camera during the reverse operation at least when the tailgate reaches a fully open position, and generate the image based on only the second image data when the first camera is deactivated.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
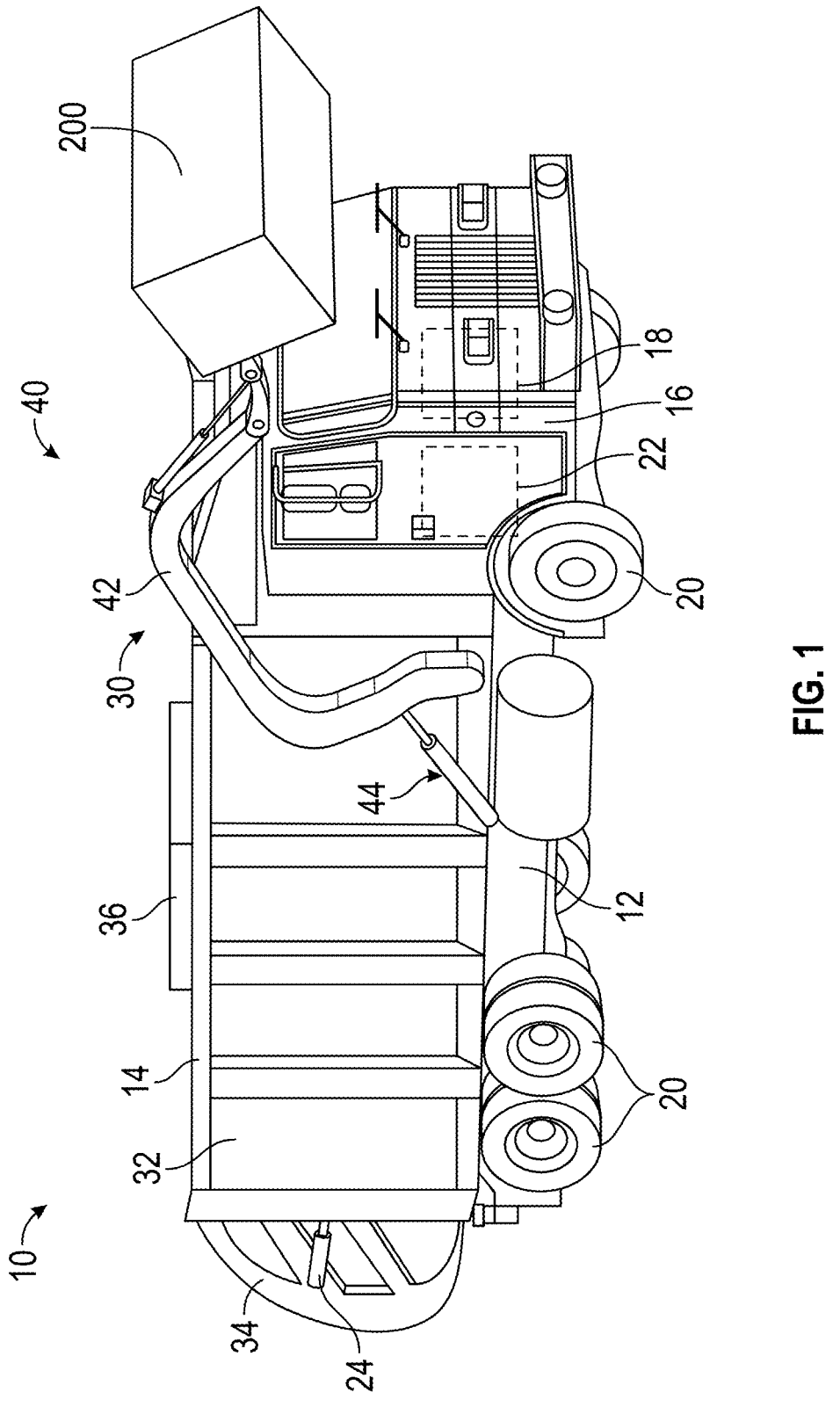
FIG. 1 is a perspective view of a front-loading refuse vehicle, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Overview

Referring generally to the FIGURES, a refuse vehicle can include a multiple camera backup system. The multiple camera backup system includes at least a first and second camera coupled to a tailgate of the refuse vehicle. The system also includes a controller that communicates with the cameras and detects a reverse operation of the refuse vehicle. During the reverse operation, the first camera captures a first image when the tailgate is in a closed position, and the second camera captures a second image when the tailgate is in a fully open position. The first and second cameras capture first and second images when the tailgate is in a partially open position. A third image is generated from the first and second images and may maintain a fixed view as the tailgate opens or closes.

In this way, the multiple backup camera system may assist an operator while driving the refuse vehicle by providing an image of areas otherwise obscured to the operator's view (e.g., blind spots, space directly behind the vehicle, etc.). Specifically, while reversing the refuse vehicle, the multiple backup camera system may beneficially allow an operator to navigate with vision of the surroundings behind the vehicle to avoid obstacles, irrespective of the position of the tailgate. For example, systems having only one backup camera located on a tailgate may lose vision or coverage of an area behind the vehicle when the tailgate changes positions. Specifically, a backup camera may be focused on a target area showing the reverse path of a vehicle while a tailgate is closed, but when the tailgate is open, the camera may be directed upwards and above the vehicle such that its field of view no longer provides a useful image showing an operator the reverse path of the vehicle. Further, systems with multiple cameras may provide varied, moving, or inconsistent views rather than a uniform viewpoint behind the vehicle. For example, a system that switches between one angle and another or a system that simultaneously displays two views may cause an operator to miss an obstacle and cause damage to equipment or personnel. Accordingly, the disclosure herein beneficially provides a multiple backup camera system that maintains a focused view of a region behind a refuse vehicle (e.g., such as a region within the backup path of the refuse vehicle) consistently during a reverse operation and regardless of the position of the tailgate.

Further, by utilizing image stitching processes and the like, the disclosure beneficially provides a backup camera system that maintains a fixed viewpoint and accounts for distortion or translation caused by varying angles of images captured by multiple cameras.

Refuse Vehicle

Front-Loading Configuration

Referring to FIG. 1, a vehicle, shown as refuse vehicle 10 (e.g., a garbage truck, a waste collection truck, a sanitation truck, etc.), is shown that is configured to collect and store refuse along a collection route. In the embodiment of FIG. 1, the refuse vehicle 10 is configured as a front-loading refuse vehicle. The refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the refuse vehicle 10 by an operator (e.g., a seat, a steering wheel, hydraulic controls, a user interface, an acceleration pedal, a brake pedal, a clutch pedal, a gear selector, switches, buttons, dials, etc.). As shown in FIG. 1, the refuse vehicle 10 includes a prime mover, shown as engine 18, coupled to the frame 12 at a position beneath the cab 16. The engine 18 is configured to provide power to tractive elements, shown as wheels 20, and/or to other systems of the refuse vehicle 10 (e.g., a pneumatic system, a hydraulic system, etc.). The engine 18 may be configured to utilize one or more of a variety of fuels (e.g., gasoline, diesel, bio-diesel, ethanol, natural gas, etc.), according to various exemplary embodiments. The fuel may be stored in a tank 28 (e.g., a vessel, a container, a capsule, etc.) that is fluidly coupled with the engine 18 through one or more fuel lines.

According to an alternative embodiment, the engine 18 additionally or alternatively includes one or more electric motors coupled to the frame 12 (e.g., a hybrid refuse vehicle, an electric refuse vehicle, etc.). The electric motors may consume electrical power from any of an on-board storage device (e.g., batteries, ultra-capacitors, etc.), from an on-board generator (e.g., an internal combustion engine, etc.), or from an external power source (e.g., overhead power lines, etc.) and provide power to the systems of the refuse vehicle 10. The engine 18 may transfer output torque to or drive the tractive elements 20 (e.g., wheels, wheel assemblies, etc.) of the refuse vehicle 10 through a transmission 22. The engine 18, the transmission 22, and one or more shafts, axles, gearboxes, etc., may define a driveline of the refuse vehicle 10.

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted. The refuse compartment 30 may provide temporary storage for refuse during transport to a waste disposal site and/or a recycling facility. In some embodiments, at least a portion of the body 14 and the refuse compartment 30 extend in front of the cab 16. According to the embodiment shown in FIG. 1, the body 14 and the refuse compartment 30 are positioned behind the cab 16. In some embodiments, the refuse compartment 30 includes a hopper volume and a storage volume. Refuse may be initially loaded into the hopper volume and thereafter transferred and/or compacted into the storage volume. According to an exemplary embodiment, the hopper volume is positioned forward of the cab 16 (e.g., refuse is loaded into a position of the refuse compartment 30 in front of the cab 16, a front-loading refuse vehicle, etc.). In other embodiments, the hopper volume is positioned between the storage volume and the cab 16 (e.g., refuse is loaded into a position of the refuse compartment 30 behind the cab 16 and stored in a position further toward the rear of the refuse compartment 30). In yet other embodiments, the storage volume is positioned between the hopper volume and the cab 16 (e.g., a rear-loading refuse vehicle, etc.).

The tailgate 34 may be hingedly or pivotally coupled with the body 14 at a rear end of the body 14 (e.g., opposite the cab 16). The tailgate 34 may be driven to rotate between an open position and a closed position by tailgate actuators 24. The refuse compartment 30 may be hingedly or pivotally coupled with the frame 12 such that the refuse compartment 30 can be driven to raise or lower while the tailgate 34 is open in order to dump contents of the refuse compartment 30 at a landfill. The refuse compartment 30 may include a packer assembly (e.g., a compaction apparatus) positioned therein that is configured to compact loose refuse.

Referring still to FIG. 1, the refuse vehicle 10 includes a first lift mechanism or system (e.g., a front-loading lift assembly, etc.), shown as lift assembly 40. The lift assembly 40 includes a pair of arms, shown as lift arms 42, coupled to at least one of the frame 12 or the body 14 on either side of the refuse vehicle 10 such that the lift arms 42 extend forward of the cab 16 (e.g., a front-loading refuse vehicle, etc.). The lift arms 42 may be rotatably coupled to frame 12 with a pivot (e.g., a lug, a shaft, etc.). The lift assembly 40 includes first actuators, shown as lift arm actuators 44 (e.g., hydraulic cylinders, etc.), coupled to the frame 12 and the lift arms 42. The lift arm actuators 44 are positioned such that extension and retraction thereof rotates the lift arms 42 about an axis extending through the pivot, according to an exemplary embodiment. Lift arms 42 may be removably coupled to a container, shown as refuse container 200 in FIG. 1. Lift arms 42 are configured to be driven to pivot by lift arm actuators 44 to lift and empty the refuse container 200 into the hopper volume for compaction and storage. The lift arms 42 may be coupled with a pair of forks or elongated members that are configured to removably couple with the refuse container 200 so that the refuse container 200 can be lifted and emptied. The refuse container 200 may be similar to the container attachment 200 as described in greater detail in U.S. application Ser. No. 17/558,183, filed Dec. 12, 2021, the entire disclosure of which is incorporated by reference herein.

Rear-Loading Configuration

Figure 2:
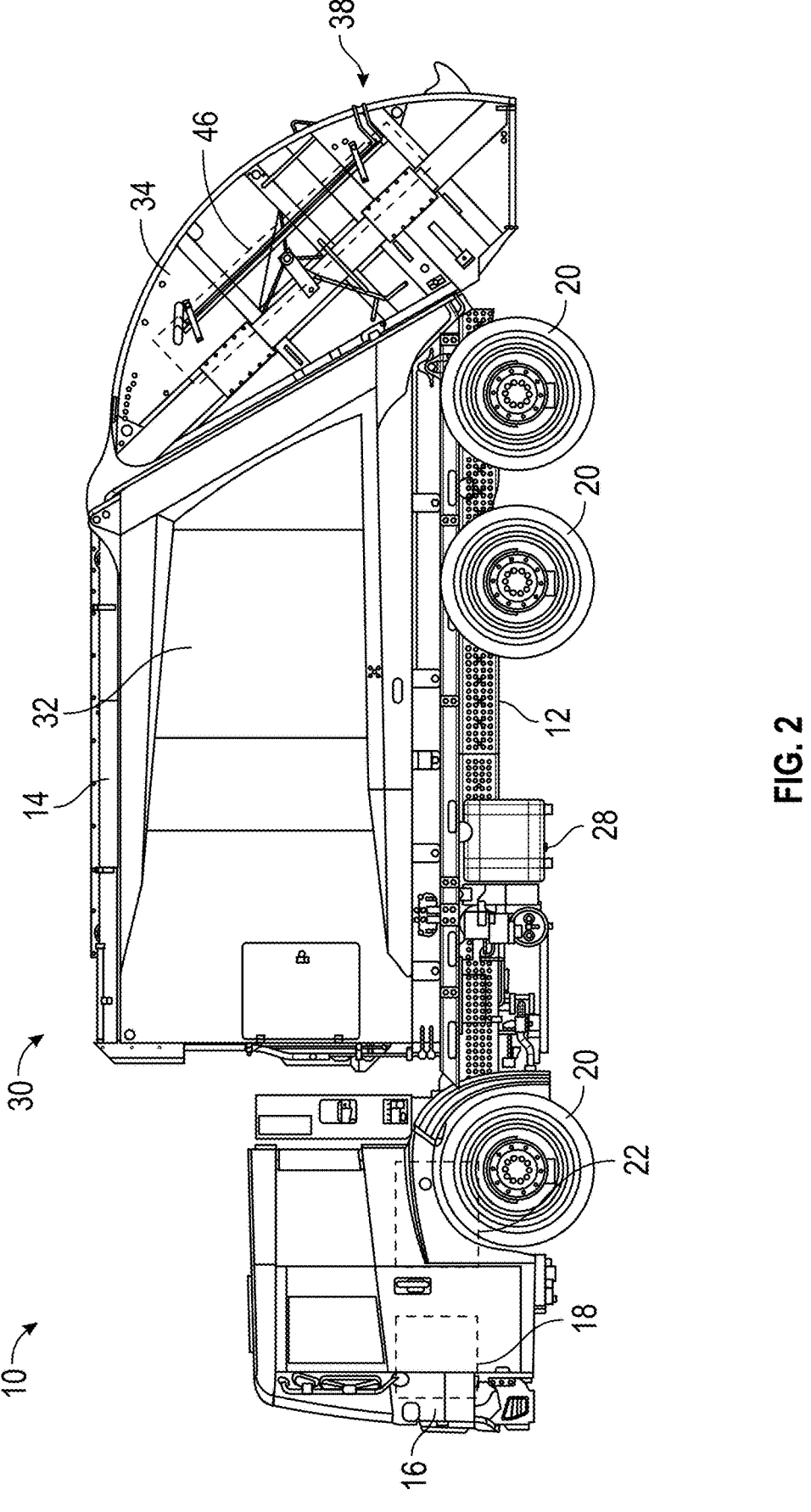
FIG. 2 is a side view of a rear-loading refuse vehicle, according to an exemplary embodiment.

As shown in FIG. 2, the refuse vehicle 10 may be configured as a rear-loading refuse vehicle, according to some embodiments. In the rear-loading embodiment of the refuse vehicle 10, the tailgate 34 defines an opening 38 through which loose refuse may be loaded into the refuse compartment 30. The tailgate 34 may also include a packer 46 (e.g., a packing assembly, a compaction apparatus, a claw, a hinged member, etc.) that is configured to draw refuse into the refuse compartment 30 for storage. Similar to the embodiment of the refuse vehicle 10 described in FIG. 1 above, the tailgate 34 may be hingedly coupled with the refuse compartment 30 such that the tailgate 34 can be opened or closed during a dumping operation.

Side-Loading Configuration

Figure 3:
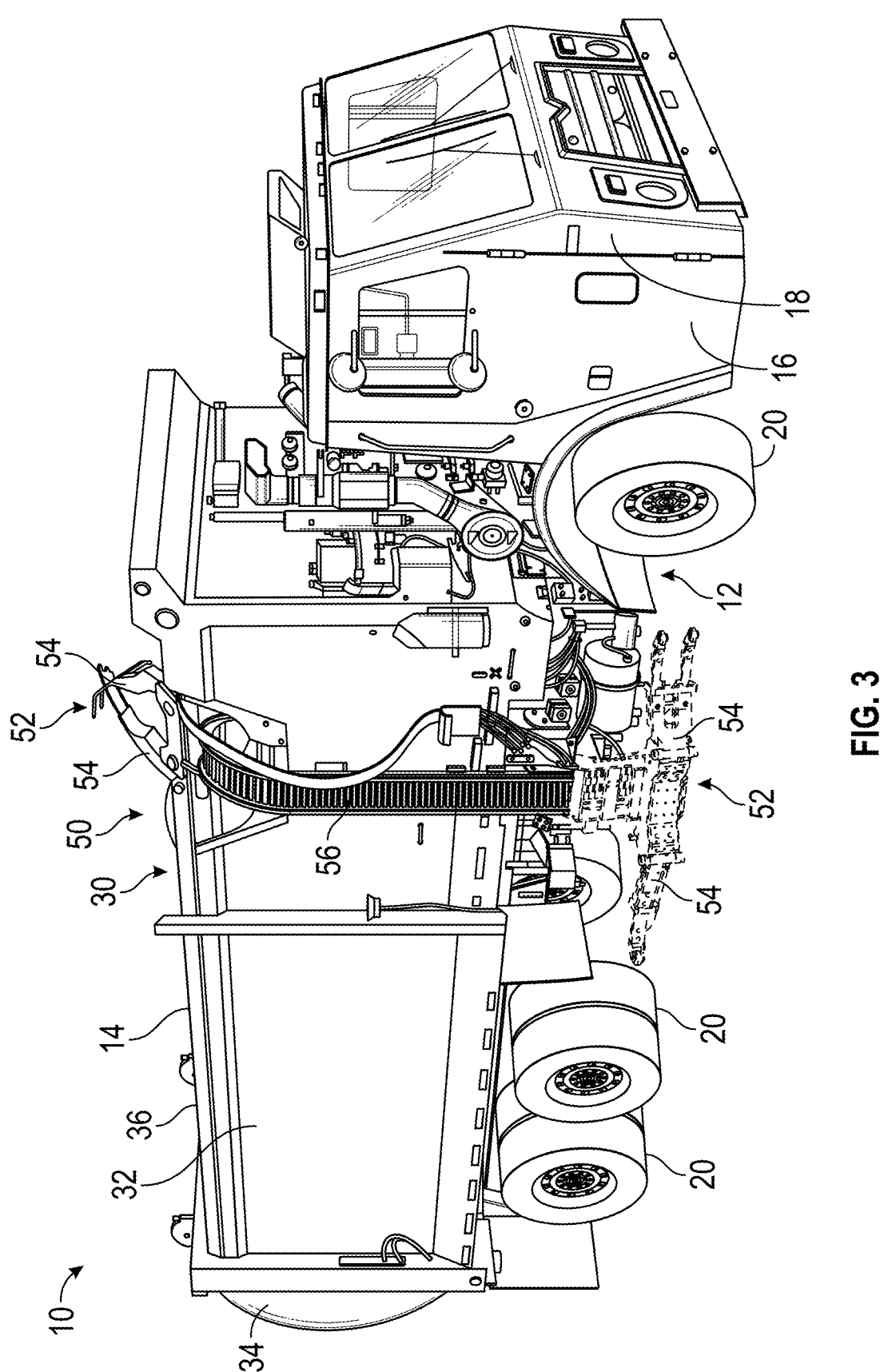
FIG. 3 is a perspective view of a side-loading refuse vehicle, according to an exemplary embodiment.

Referring to FIG. 3, the refuse vehicle 10 may be configured as a side-loading refuse vehicle (e.g., a zero radius side-loading refuse vehicle). The refuse vehicle 10 includes first lift mechanism or system, shown as lift assembly 50. Lift assembly 50 includes a grabber assembly, shown as grabber assembly 52, movably coupled to a track, shown as track 56, and configured to move along an entire length of track 56. According to the exemplary embodiment shown in FIG. 3, track 56 extends along substantially an entire height of body 14 and is configured to cause grabber assembly 52 to tilt near an upper height of body 14. In other embodiments, the track 56 extends along substantially an entire height of body 14 on a rear side of body 14. The refuse vehicle 10 can also include a reach system or assembly coupled with a body or frame of refuse vehicle 10 and lift assembly 50. The reach system can include telescoping members, a scissors stack, etc., or any other configuration that can extend or retract to provide additional reach of grabber assembly 52 for refuse collection.

Referring still to FIG. 3, grabber assembly 52 includes a pair of grabber arms shown as grabber arms 54. The grabber arms 54 are configured to rotate about an axis extending through a bushing. The grabber arms 54 are configured to releasably secure a refuse container to grabber assembly 52, according to an exemplary embodiment. The grabber arms 54 rotate about the axis extending through the bushing to transition between an engaged state (e.g., a fully grasped configuration, a fully grasped state, a partially grasped configuration, a partially grasped state) and a disengaged state (e.g., a fully open state or configuration, a fully released state/configuration, a partially open state or configuration, a partially released state/configuration). In the engaged state, the grabber arms 54 are rotated towards each other such that the refuse container is grasped therebetween. In the disengaged state, the grabber arms 54 rotate outwards such that the refuse container is not grasped therebetween. By transitioning between the engaged state and the disengaged state, the grabber assembly 52 releasably couples the refuse container with grabber assembly 52. The refuse vehicle 10 may pull up along-side the refuse container, such that the refuse container is positioned to be grasped by the grabber assembly 52 therebetween. The grabber assembly 52 may then transition into an engaged state to grasp the refuse container. After the refuse container has been securely grasped, the grabber assembly 52 may be transported along track 56 with the refuse container. When the grabber assembly 52 reaches the end of track 56, the grabber assembly 52 may tilt and empty the contents of the refuse container in refuse compartment 30. The tilting is facilitated by the path of the track 56. When the contents of the refuse container have been emptied into refuse compartment 30, the grabber assembly 52 may descend along the track 56 and return the refuse container to the ground. Once the refuse container has been placed on the ground, the grabber assembly may transition into the disengaged state, releasing the refuse container.

Control System

Figure 4:
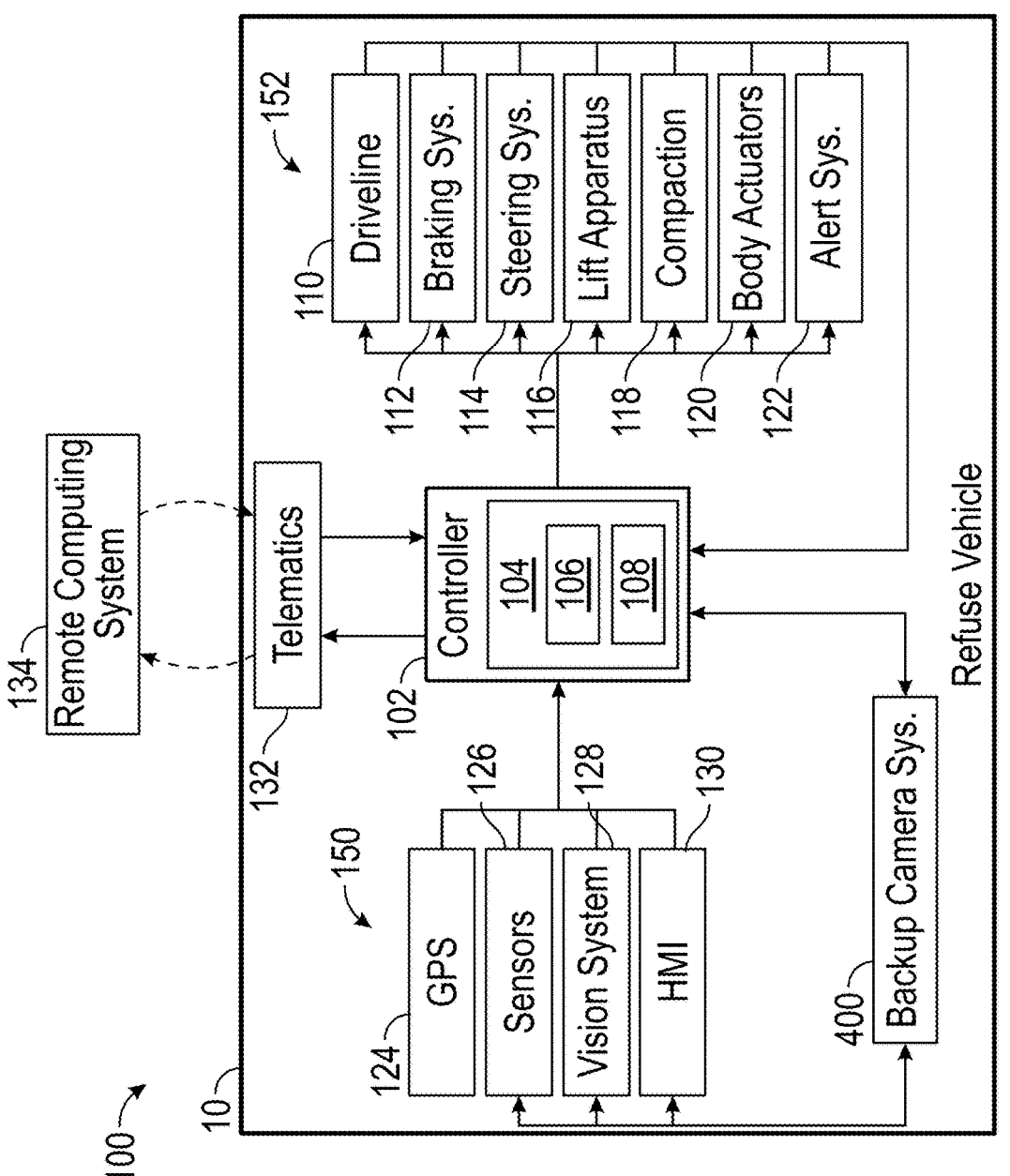
FIG. 4 is an example block diagram of a control system for any of the refuse vehicles of FIGS. 1-3 equipped with a multiple backup camera system, according to an exemplary embodiment.

Referring to FIG. 4, the refuse vehicle 10 may include a control system 100 that is configured to facilitate autonomous or semi-autonomous operation of the refuse vehicle 10, or components thereof. The control system 100 includes a controller 102 that is positioned on the refuse vehicle 10, a remote computing system 134, a telematics unit 132, one or more input devices 150, and one or more controllable elements 152. The input devices 150 can include a Global Positioning System ("GPS"), multiple sensors 126, a vision system 128 (e.g., an awareness system), and a Human Machine Interface ("HMI"). The controllable elements 152 can include a driveline 110 of the refuse vehicle 10, a braking system 112 of the refuse vehicle 10, a steering system 114 of the refuse vehicle 10, a lift apparatus 116 (e.g., the lift assembly 40, the lift assembly 50, etc.), a compaction system 118 (e.g., a packer assembly, the packer 46, etc.), body actuators 120 (e.g., tailgate actuators 24, lift or dumping actuators, etc.), and/or an alert system 122.

The controller 102 includes processing circuitry 104 including a processor 106 and memory 108. Processing circuitry 104 can be communicably connected with a communications interface of controller 102 such that processing circuitry 104 and the various components thereof can send and receive data via the communications interface. Processor 106 can be implemented as a general purpose processor, an application specific integrated circuit (ASIC), one or more field programmable gate arrays (FPGAs), a group of processing components, or other suitable electronic processing components.

Memory 108 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 108 can be or include volatile memory or non-volatile memory. Memory 108 can include database components, object code components, script components, or any other type of information structure for supporting the various activities and information structures described in the present application. According to some embodiments, memory 108 is communicably connected to processor 106 via processing circuitry 104 and includes computer code for executing (e.g., by at least one of processing circuitry 104 or processor 106) one or more processes described herein.

The controller 102 is configured to receive inputs (e.g., measurements, detections, signals, sensor data, etc.) from the input devices 150, according to some embodiments. In particular, the controller 102 may receive a GPS location from the GPS system 124 (e.g., current latitude and longitude of the refuse vehicle 10). The controller 102 may receive sensor data (e.g., engine temperature, fuel levels, transmission control unit feedback, engine control unit feedback, speed of the refuse vehicle 10, etc.) from the sensors 126. The controller 102 may receive image data (e.g., real-time camera data) from the vision system 128 of an area of the refuse vehicle 10 (e.g., in front of the refuse vehicle 10, rearwards of the refuse vehicle 10, on a street-side or curb-side of the refuse vehicle 10, at the hopper of the refuse vehicle 10 to monitor refuse that is loaded, within the cab 16 of the refuse vehicle 10, etc.). The controller 102 may receive user inputs from the HMI 130 (e.g., button presses, requests to perform a lifting or loading operation, driving operations, steering operations, braking operations, etc.).

The controller 102 may be configured to provide control outputs (e.g., control decisions, control signals, etc.) to the driveline 110 (e.g., the engine 18, the transmission 22, the engine control unit, the transmission control unit, etc.) to operate the driveline 110 to transport the refuse vehicle 10. The controller 102 may also be configured to provide control outputs to the braking system 112 to activate and operate the braking system 112 to decelerate the refuse vehicle 10 (e.g., by activating a friction brake system, a regenerative braking system, etc.). The controller 102 may be configured to provide control outputs to the steering system 114 to operate the steering system 114 to rotate or turn at least two of the tractive elements 20 to steer the refuse vehicle 10. The controller 102 may also be configured to operate actuators or motors of the lift apparatus 116 (e.g., lift arm actuators 44) to perform a lifting operation (e.g., to grasp, lift, empty, and return a refuse container). The controller 102 may also be configured to operate the compaction system 118 to compact or pack refuse that is within the refuse compartment 30. The controller 102 may also be configured to operate the body actuators 120 to implement a dumping operation of refuse from the refuse compartment 30 (e.g., driving the refuse compartment 30 to rotate to dump refuse at a landfill). The controller 102 may also be configured to operate the alert system 122 (e.g., lights, speakers, display screens, etc.) to provide one or more aural or visual alerts to nearby individuals.

The controller 102 may also be configured to receive feedback from any of the driveline 110, the braking system 112, the steering system 114, the lift apparatus 116, the compaction system 118, the body actuators 120, or the alert system 122. The controller may provide any of the feedback to the remote computing system 134 via the telematics unit 132. The telematics unit 132 may include any wireless transceiver, cellular dongle, communications radios, antennas, etc., to establish wireless communication with the remote computing system 134. The telematics unit 132 may facilitate communications with telematics units 132 of nearby refuse vehicles 10 to thereby establish a mesh network of refuse vehicles 10.

The controller 102 is configured to use any of the inputs from any of the GPS 124, the sensors 126, the vision system 128, or the HMI 130 to generate controls for the driveline 110, the braking system 112, the steering system 114, the lift apparatus 116, the compaction system 118, the body actuators 120, or the alert system 122. In some embodiments, the controller 102 is configured to operate the driveline 110, the braking system 112, the steering system 114, the lift apparatus 116, the compaction system 118, the body actuators 120, and/or the alert system 122 to autonomously transport the refuse vehicle 10 along a route (e.g., self-driving), perform pickups or refuse collection operations autonomously, and transport to a landfill to empty contents of the refuse compartment 30. The controller 102 may receive one or more inputs from the remote computing system 134 such as route data, indications of pickup locations along the route, route updates, customer information, pickup types, etc. The controller 102 may use the inputs from the remote computing system 134 to autonomously transport the refuse vehicle 10 along the route and/or to perform the various operations along the route (e.g., picking up and emptying refuse containers, providing alerts to nearby individuals, limiting pickup operations until an individual has moved out of the way, etc.).

In some embodiments, the remote computing system 134 is configured to interact with (e.g., control, monitor, etc.) the refuse vehicle 10 through a virtual refuse truck as described in U.S. application Ser. No. 16/789,962, now U.S. Pat. No. 11,380,145, filed Feb. 13, 2020, the entire disclosure of which is incorporated by reference herein. The remote computing system 134 may perform any of the route planning techniques as described in greater detail in U.S. application Ser. No. 18/111,137, filed Feb. 17, 2023, the entire disclosure of which is incorporated by reference herein. The remote computing system 134 may implement any route planning techniques based on data received by the controller 102. In some embodiments, the controller 102 is configured to implement any of the cart alignment techniques as described in U.S. application Ser. No. 18/242,224, filed Sep. 5, 2023, the entire disclosure of which is incorporated by reference herein. The refuse vehicle 10 and the remote computing system 134 may also operate or implement geofences as described in greater detail in U.S. application Ser. No. 17/232,855, filed Apr. 16, 2021, the entire disclosure of which is incorporated by reference herein.

Figure 5:
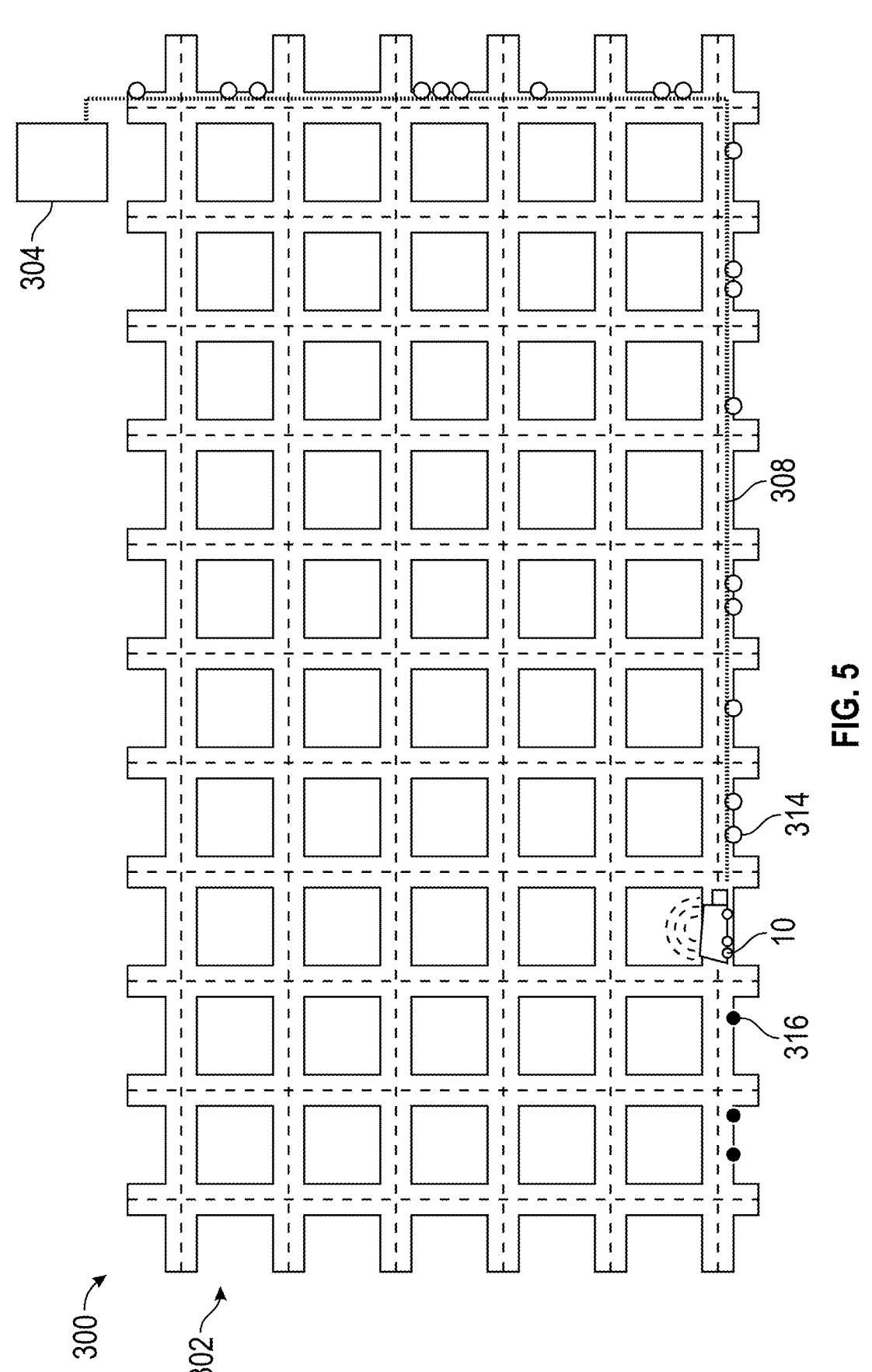
FIG. 5 is a diagram illustrating a collection route for autonomous transport and collection by any of the refuse vehicles of FIGS. 1-3, according to an exemplary embodiment.

Referring to FIG. 5, a diagram 300 illustrates a route 308 through a neighborhood 302 for the refuse vehicle 10. The route 308 includes future stops 314 along the route 308 to be completed, and past stops 316 that have already been completed. The route 308 may be defined and provided by the remote computing system 134. The remote computing system 134 may also define or determine the future stops 314 and the past stops 316 along the route 308 and provide data regarding the geographic location of the future stops 314 and the past stops 316 to the controller 102 of the refuse vehicle 10. The refuse vehicle 10 may use the route data and the stops data to autonomously transport along the route 308 and perform refuse collection at each stop. The route 308 may end at a landfill 304 (e.g., an end location) where the refuse vehicle 10 may autonomously empty collected refuse, transport to a refueling location if necessary, and begin a new route.

Multiple Backup Cameras for Refuse Vehicle

Referring back to FIG. 4, the refuse vehicle 10 includes a backup camera system 400 configured to capture an image showing the area proximate to the rear of the refuse vehicle 10. The backup camera system 400 is configured to maintain the image of the area proximate to the rear of the refuse vehicle 10 irrespective of the position of the tailgate 34. For example, while in a reverse operation, an image of the area behind the refuse vehicle 10 may be generated and presented to an operator. The tailgate 34 of the refuse vehicle 10 may open or close during the reverse operation. However, the backup camera system 400 continues to display the image of the area behind the refuse vehicle 10 regardless of the position of the tailgate 34 by selectively capturing images via a plurality of cameras of the vision system 128.

The backup system 400 may include one or more components of the control system 100 described above. The backup system 400 includes sensors 126 and/or components of the visions system 128 configured to capture images of the region surrounding the rear of the refuse vehicle 10. As shown in FIGS. 6 and 8-10, the backup system 400 includes at least a first camera 61 and a second camera 62. In the illustrated embodiments, the cameras 61, 62 are rear-facing (e.g., pointing generally parallel to a direction opposite of the cab 16 of the vehicle 10) and directed toward a target area behind the body 14 of the vehicle 10. That is, the cameras 61, 62 are arranged so that a field of view defined by the cameras 61, 62 includes a target area where the vehicle 10 may enter when travelling in a reverse direction (e.g., operating in a reverse mode).

As shown in FIGS. 6 and 8-10, the cameras 61, 62 are integrated into or coupled to the tailgate 34. For example, the cameras 61, 62 may be mounted to and/or integrated into or installed on the tailgate 34 of the vehicle 10. In some embodiments, the first camera 61 is coupled to the surface of the tailgate 34 at a first location above a second location of the second camera 62 (e.g., the first camera 61 may be positioned proximate a center of the tailgate 34 and the second camera may be positioned proximate a bottom of the tailgate 34). In this way, the first camera 61 is configured to capture an image of a first field of view A visible by the first camera 61 that includes a region at least partially above a second field of view B visible by the second camera 62. As shown in FIGS. 6 and 8-10, the field of view of the cameras 61, 62 are represented by dotted lines (indicating a powered off camera, a camera not currently capturing an image, etc.), solid lines (indicating a powered on camera, a camera currently capturing an image, etc.), and dot-dashed lines (indicating an area of overlap of one or more field of view of two active cameras or an active camera and an inactive camera).

In some embodiments, the backup system 400 may include additional sensors 146 and/or components of the vision system 128 (e.g., additional cameras, ultrasonic sensors, proximity sensors, infrared sensors, and the like) coupled to an exterior of other portions of the vehicle 10. For example, additional cameras may be coupled to left or right rear side panels 32 of the body 14, portions of the body 14 that allow the cameras/sensors to be directed towards the rear or sides of the vehicle 10, etc. In some embodiments, the cameras 61, 62 are in the form of a DSLR camera, a CCD camera, a time of flight camera, or any other equivalent camera capable of capturing an image of a target area. Regardless of the specific configuration of the vehicle 10 and/or the mounting location of the cameras 61, 62, the cameras 61, 62 and/or additional sensors 126 or components of the vision system 128 are coupled to the vehicle 10 so that that field of view defined by the respective device includes the target area where the refuse vehicle 10 is expected to travel when in a reverse operation.

The backup system 400 may also include sensors 146 configured to measure a position of the tailgate 34. For example, the backup system 400 may include a first sensor 64 such as an inclinometer coupled to the tailgate 34, a tailgate actuator 24, or the like to determine an angle at which the tailgate 34 is positioned. The controller 102 may receive a signal from the first sensor 64 and correlate the signal to a position of the tailgate 34. For example, a reading of the inclinometer may represent that the tailgate 34 is in a closed position 70 (e.g., where the tailgate 34 is fully lowered and seals the rear portion of the refuse compartment 30). In other embodiments where a sensor 146 is not configured to measure a position of the tailgate 34, the controller 102 may be configured to detect a position of the tailgate 34 by other processes or via other signals. For example, the controller 102 may receive a signal indicating that the tailgate actuator 24 is in operation. The controller 102 may start a timer in response to the activation of the tailgate actuator 24 operating. The controller 102 may be configured to correlate a time of activation of the tailgate actuator 24 to a position, angle, or degree of openness of the tailgate 34. Other similar methods of determining the position of the tailgate 34 as would be apparent to a person of ordinary skill in the art are contemplated by and within the scope of this disclosure.

Figure 6:
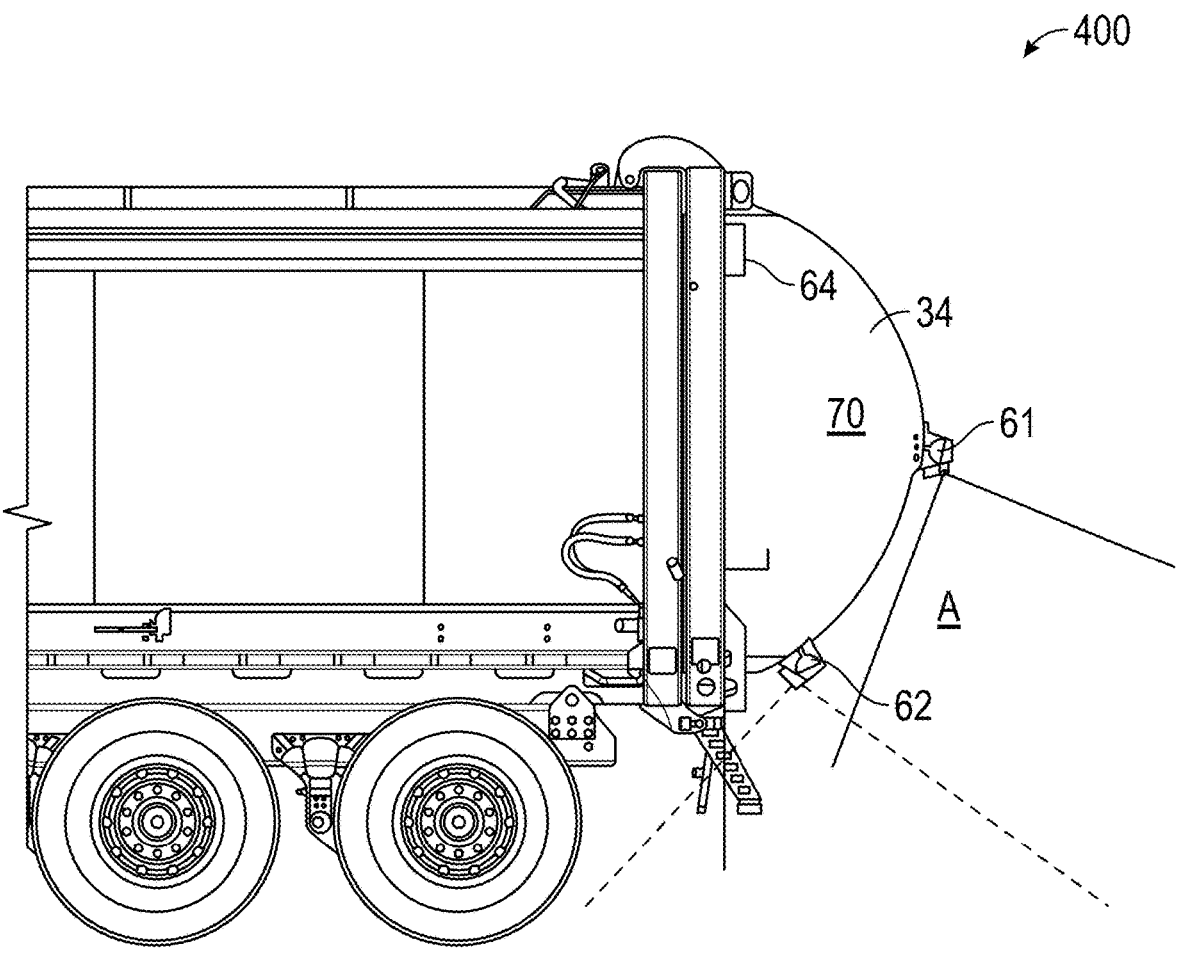
FIG. 6 is a side perspective view of a multiple backup camera system of any of the refuse vehicles of FIGS. 1-3, according to an exemplary embodiment.

The backup system 400 may also include one or more components of the HMI 130 such as a display (e.g., a screen, monitor, or the like positioned within the cab 16). The controller 102 and/or the backup system 400 are in communication with the display, and the display is in communication with the cameras 61, 62. The display is configured to display images captured by the cameras 61, 62. As shown in FIG. 6, when the tailgate 34 is in a closed position 70, the first camera 61 may be configured to be active/capture images when the vehicle 10 is in a reverse operation, while the second camera 62 located below the first camera 61 may be configured to be off and not capture images.

Figure 7:
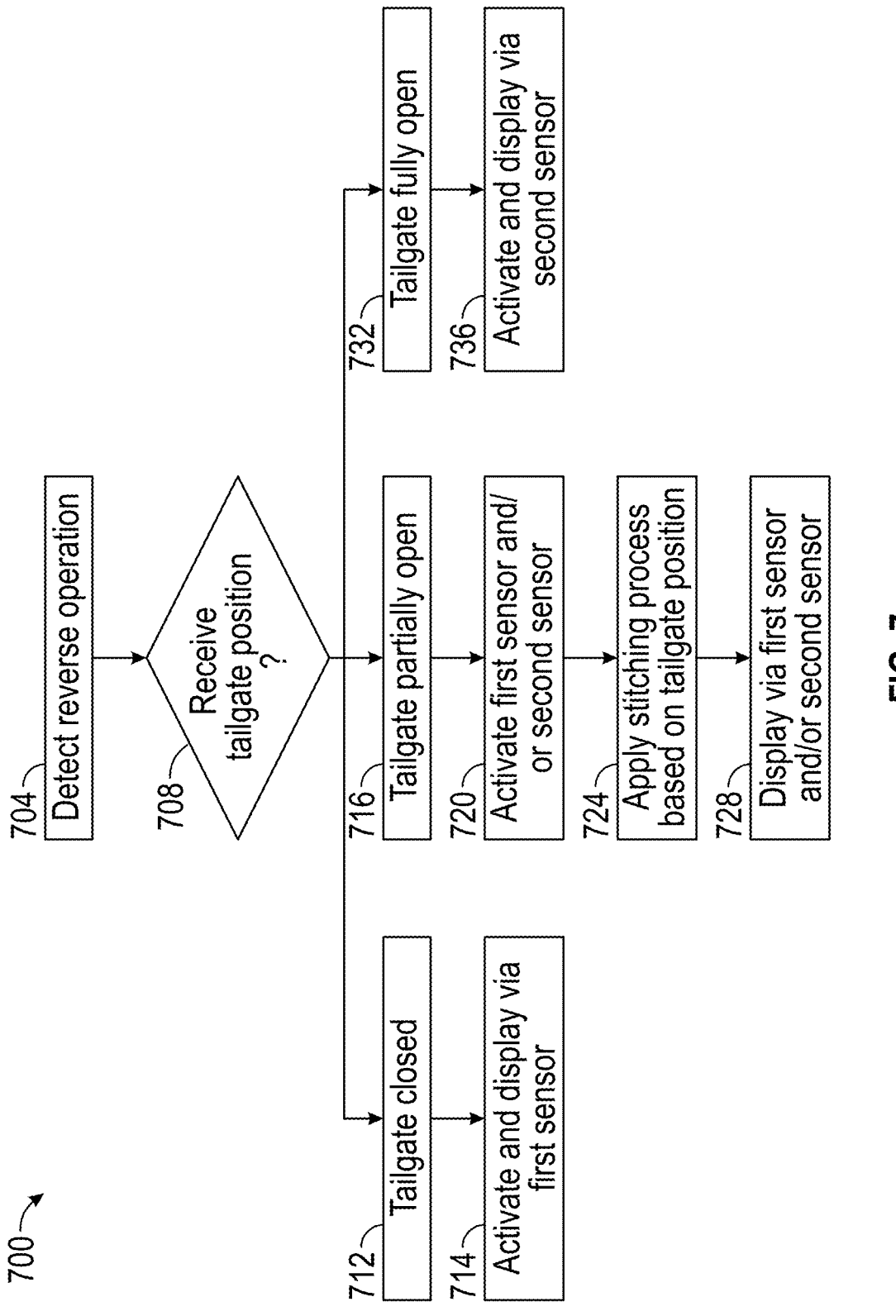
FIG. 7 is a flow chart illustrating an example method of operation for a multiple backup camera system of any of the refuse vehicles of FIGS. 1-3.

Turning to FIG. 7, a flowchart showing example steps of a method 700 of operation of the backup camera system 400 disclosed herein is shown. In other embodiments, the steps may be rearranged in various order, may be repeated, may be combined with other steps, may include additional or intervening steps, or the like. As shown in FIG. 7, step 704 includes detecting a reverse operation. The controller 102 may receive a signal indicating that the vehicle 10 is preparing or is configured to travel in a reverse direction. For example, the signal may be received when the vehicle 10 is placed in a reverse gear. When the controller 102 detects a reverse operation of the vehicle 10, the controller 102 may activate one or more cameras of the backup system 400. The controller 102 may selectively activate one or more cameras based on a position of the tailgate 34.

Figure 8:
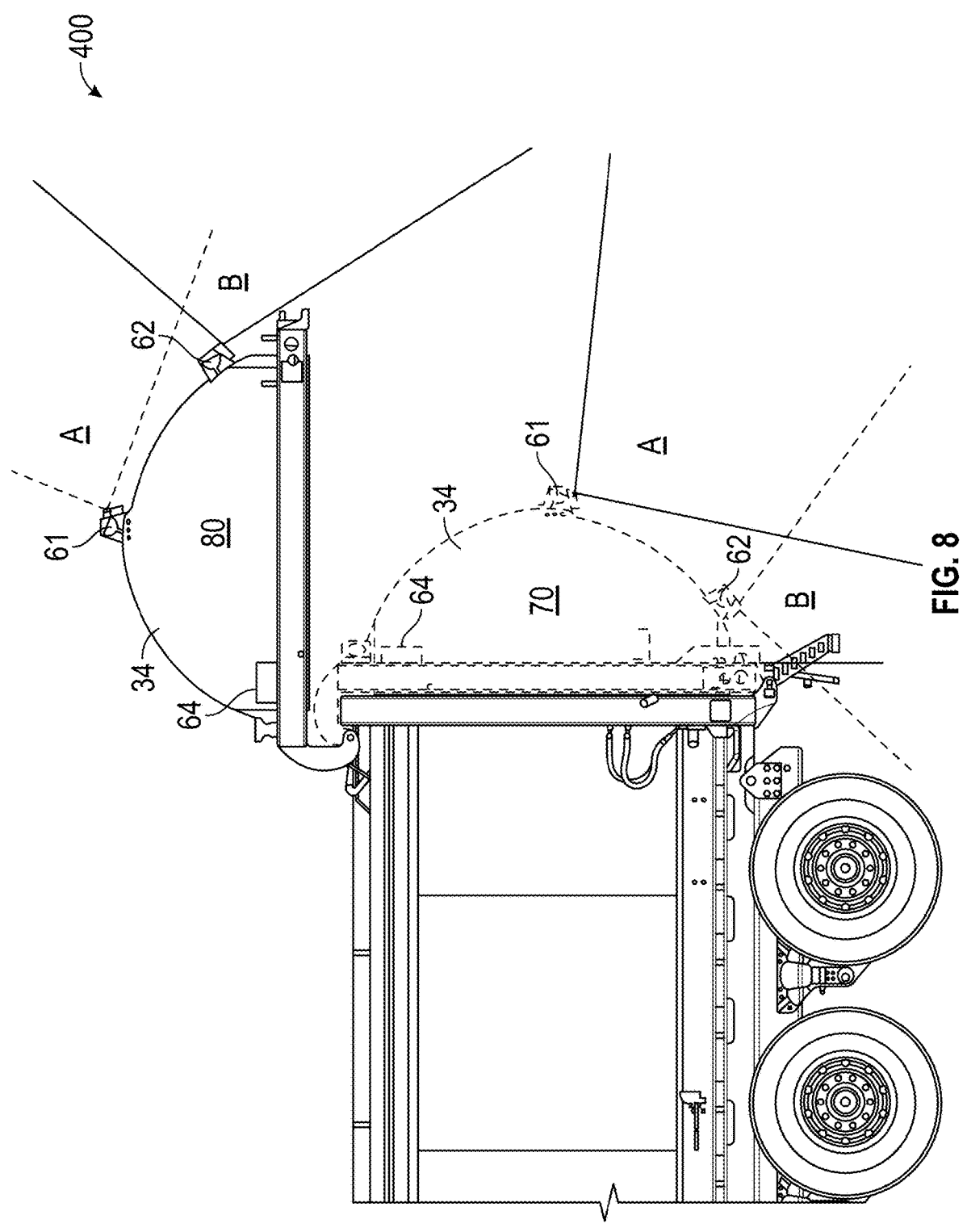
FIG. 8 is a side perspective view of a multiple backup camera system of any of the refuse vehicles of FIGS. 1-3 showing both a tailgate in a fully open position and a closed position, according to an exemplary embodiment.
Figure 9:
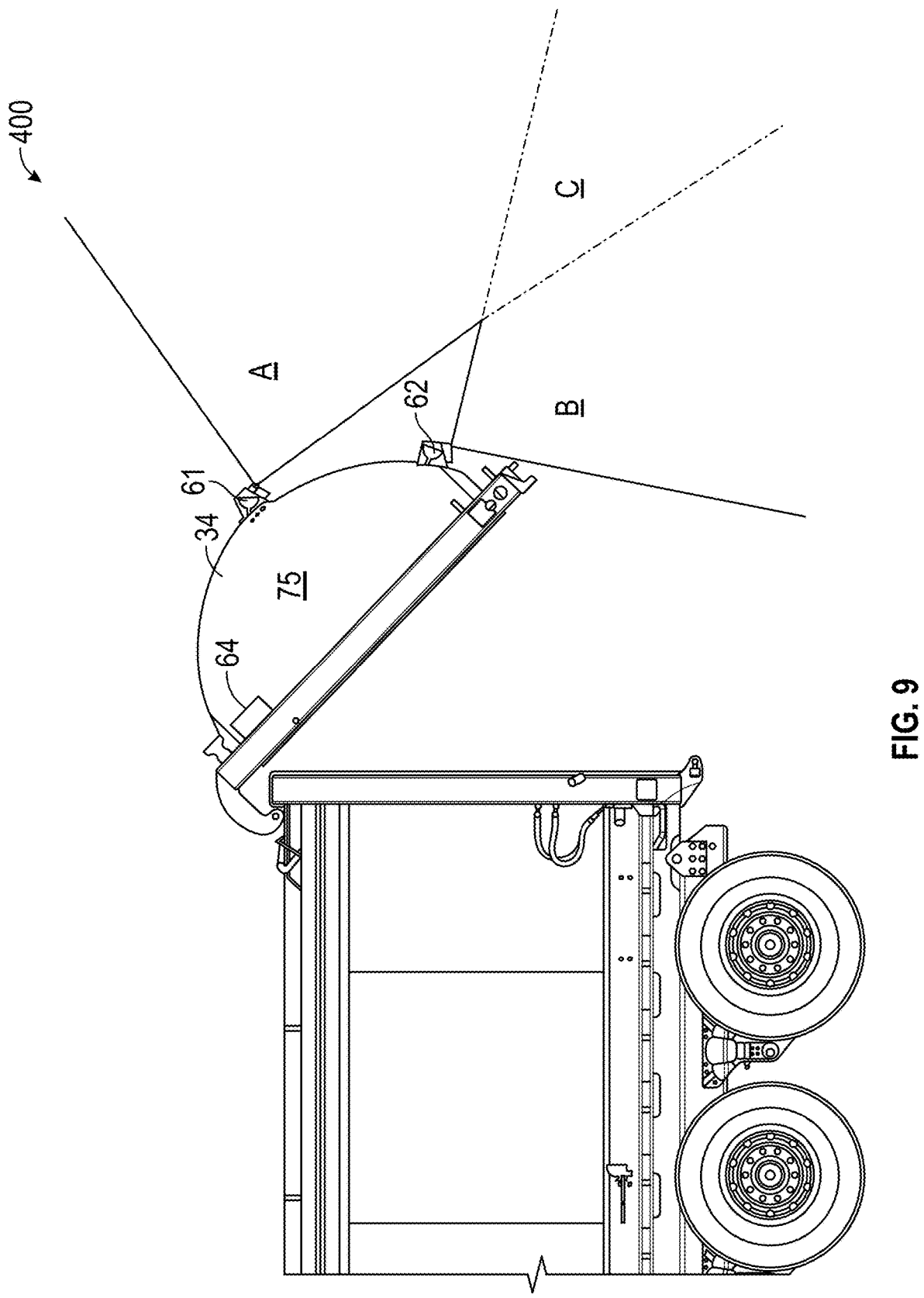
FIG. 9 is a side perspective view of a multiple backup camera system of any of the refuse vehicles of FIGS. 1-3 showing a tailgate in a partially open position, according to an exemplary embodiment.
Figure 10:
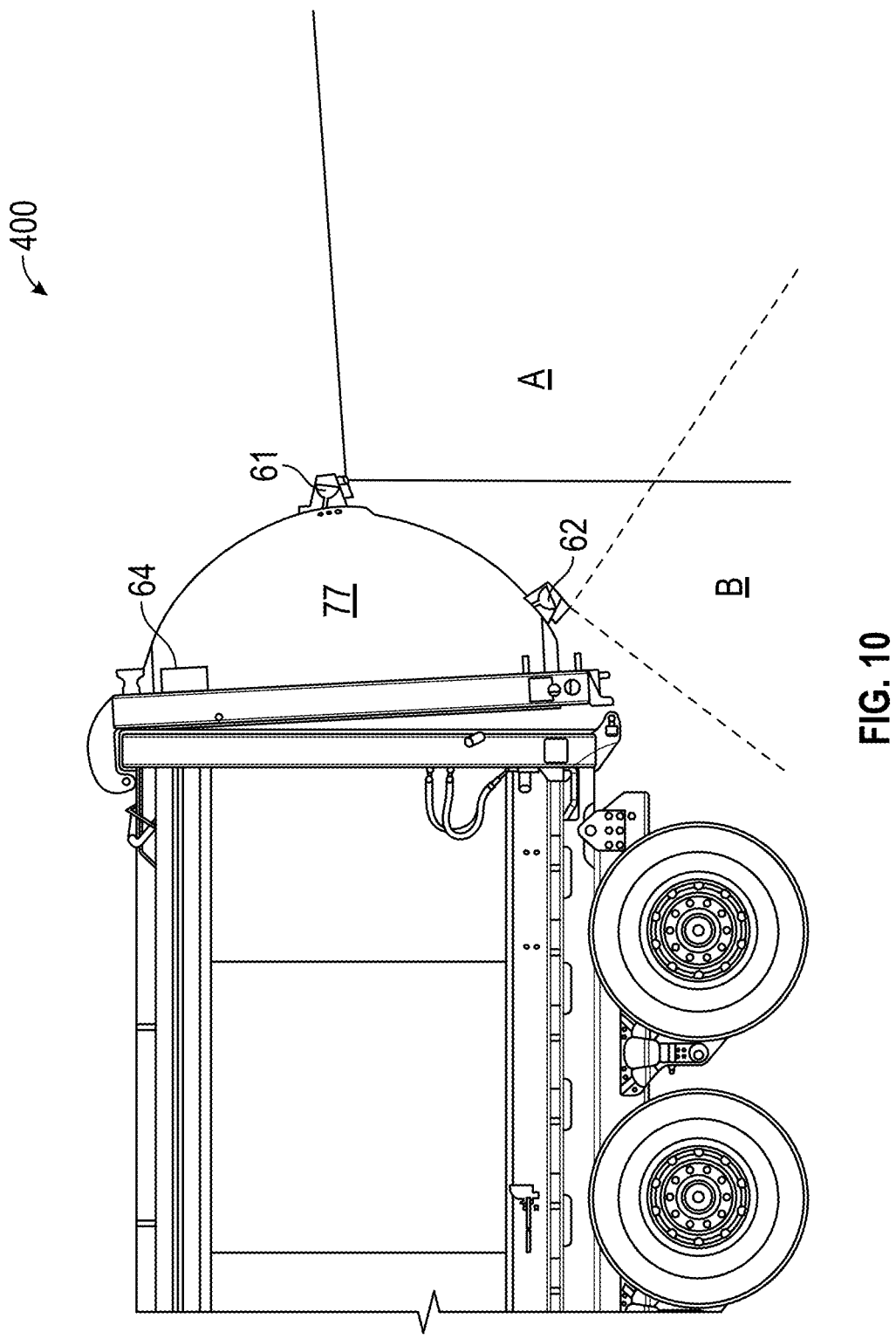
FIG. 10 is a side perspective view of a multiple backup camera system of any of the refuse vehicles of FIGS. 1-3 showing a tailgate in a partially open position, according to another exemplary embodiment.

Step 708 includes, receiving, by the controller 102, an indication of a position of the tailgate 34. For example, as shown in FIGS. 8-10, the tailgate 34 may be in a closed position 70, a fully open position 80, or at a partially open position between the fully open position 80 and the closed position 70 (e.g., a first partially open position 75, a second partially open position 77). The tailgate 34 position may determine or define a position of the field of view of the respective cameras (e.g., the first field of view A of the first camera 61, the second field of view B of the second camera 62). Specifically, the field of view of the cameras 61, 62 may only be centered, focused, or otherwise capture the target area behind the vehicle 10 where the vehicle 10 may travel when in reverse when the tailgate 34 is in a certain position. As shown in FIG. 6, when the tailgate 34 is in a closed position, the second field of view B of the second camera 62 is substantially directed towards the ground and/or below the vehicle 10 and may not provide sufficient coverage of the target area behind the vehicle 10 (e.g., to assist an operator in reversing the vehicle 10). Similarly, as shown in FIG. 8, when the tailgate 34 is an a fully open position 80, the first field of view A of the first camera 61 may be substantially directed upward and/or above the rear of the vehicle 10 such that the first field of view A also may not provide sufficient coverage of the target area behind the vehicle 10 (e.g., to assist an operator in reversing the vehicle 10). Accordingly, as shown in FIG. 7 and described herein, the controller 102 and/or the backup camera system 400 may selectively activate or deactivate one or more of the cameras 61, 62 based on the position of the tailgate 34 in order to maintain a fixed image centered, directed, or otherwise focused on the target area behind the vehicle 10.

For example, at step 712, the controller 102 may detect that the tailgate 34 is in the fully closed position 70. While the tailgate 34 is in the fully closed position 70 and the vehicle 10 is in the reverse operation, the controller 102 and/or the backup system 400 may activate the first camera 61 and display the first field of view A, which may be focused on the target area behind the vehicle 10. Additionally, the second camera 62 may remain inactive or off while the tailgate 34 is in the fully closed position 70. Accordingly, at step 714, the first camera 61 may be active and display an image of the surroundings behind the vehicle 10 (e.g., to a display in the cab 16 such that an operator may navigate in reverse while viewing the target area behind the vehicle 10 in the reverse path of the vehicle 10).

Focusing on FIG. 7 and FIG. 8, the controller 102 may also detect that the tailgate 34 is in the fully open position 80. As shown in steps 732 and steps 736, while the tailgate 34 is in the fully open position 80 and the vehicle 10 is in the reverse operation, the controller 102 and/or the backup system 400 may deactivate the first camera 61 and activate the second camera 62 to display the second field of view B, which may be focused on the target area behind the vehicle 10. Accordingly, the second camera 62 may be active and display an image of the surroundings behind the vehicle 10 (e.g., to a display in the cab 16 such that an operator may navigate in reverse while viewing the target area behind the vehicle 10 in the reverse path of the vehicle 10).

The controller 102 and the backup camera system 400 are also configured to maintain a focused, directed, etc. view of the surroundings of the rear of the vehicle 10 while the tailgate 34 is located at a partially open position (e.g., neither fully closed nor fully open) between the closed position 70 and the fully open position 80. In this way, while the vehicle 10 is in a reverse operation, the tailgate 34 may be opened or closed, and during the process of opening or closing the tailgate 34, the image/display of the surroundings behind the vehicle 10 may be uninterrupted, may not change, or may otherwise remain focused on a region behind the vehicle 10 sufficient to allow an operator to navigate the vehicle 10 in a reverse direction.

For example, at step 716, the controller 102 and/or the backup camera system 400 may determine that the tailgate 34 is in a partially open position (e.g., the first partially open position 75). As shown in FIG. 9, at a partially open position, the first field of view A of the first camera 61 may capture a first portion (but not all) and the second field of view B of the second camera 62 may capture a second portion (but not all) of the target region behind the vehicle 10. Further, the cameras 61, 62 may share an overlapping field of view C directed at the target region behind the vehicle 10. As shown in FIG. 9, by selectively activating both the first camera 61 and the second camera 62 while the tailgate 34 is in the first partially open position 75, the controller 102 and/or the backup camera system 400 may obtain an image of the target view behind the vehicle 10 unable to be obtained by only one of the first camera 61 or the second camera 62 alone. Accordingly, at step 720, while the tailgate 34 is in the partially open position, the controller 102 and/or the backup camera system 400 may activate both the first camera 61 and the second camera 62.

Further, the backup camera system 400, the controller 102, and/or the control system 100 may include one or more circuits, algorithms, or image processing systems configured to generate a combined image from the views captured by one or more of the cameras (e.g., the first camera 61 and the second camera 62). At steps 724 and 728, the controller 102, the backup camera system 400, and/or the control system 100 are configured to combine, selectively view/display, or otherwise adjust the captured images in order uniformly/constantly display the target region behind the vehicle 10. For example, the memory 108 may contain instructions thereon configured to perform one or more of feature matching, photogrammetry, image stitching, image transformation, panoramic image combination, image focusing, or like processes to combine the image of the first view point A and the image of the second view point B in the overlapping field of view C in order to generate and display a third image to display showing the target area behind the vehicle 10. As the angle of the tailgate 34 changes in the partially open position, the controller 102 and/or the backup camera system 400 may be configured to selectively adjust the feature matching, photogrammetry, imagine stitching, or like process such that the field of view of the third image maintains the same. For example, as the tailgate 34 becomes more and more open and less of the first field of view A of the first camera 61 covers the target area behind the vehicle 10, the controller 102 and/or the backup camera system 400 may adjust the image stitching process to utilize more of the second field of view B of the second camera 61 when generating the third image. Accordingly, the display may be configured to receive an image via the backup camera system 400 that remains focused, centered, or otherwise directed to a set section or viewpoint of the target area behind the vehicle 10 regardless of the position of the tailgate 34 and while the tailgate 34 is in motion, open, closed, etc.

Turning to FIG. 10, in some embodiments, the tailgate 34 may be positioned at a partially opened position (e.g., a second partially open position 77) wherein the target area behind the vehicle 10 is sufficiently covered by the view of only one camera 61, 62 even though a portion of the target region may also be in an overlapping field of view. For example, as shown in FIG. 10, when the tailgate 34 is very slightly opened (e.g., opened by about 5-10 degrees), the first field of view A of the first camera 61 may only shift slightly and may still cover the entire target area showing the reverse travel path of the vehicle 10, even if a small portion of the second field of view B of the second camera 62 also overlaps with the target area. In some embodiments, at positions such as the second partially open position 77, the controller 102 and/or the backup camera system 400 may activate only one camera (e.g., the first camera 61 in FIG. 10) even though the tailgate 34 is neither closed nor fully open. Instead of applying an image stitching process, the controller 102 and/or the backup camera system 400 may selectively display a portion of the field of view (e.g., the first field of view A) that sufficiently covers the target area. For example, the controller 102 and/or the backup system 400 may crop or focus the view of the first camera 61 to some or all of the first field of view A and may omit other portions such as a portion that is directed upwards/above the target area behind the vehicle 10.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A refuse vehicle comprising:
a chassis;
a body coupled to the chassis, the body defining a refuse compartment;
a tailgate pivotally coupled to the body at a rear of the refuse compartment;
a first camera coupled to the tailgate and disposed at a first location of the tailgate to position the first camera to capture, with the tailgate at a closed position, a first field of view of a region behind the tailgate;
a second camera coupled to the tailgate and disposed at a second location, lower than the first location, of the tailgate to position the second camera, with the tailgate at the closed position, towards a ground surface to capture a second field of view of the region behind the tailgate, wherein the first field of view and the second field of view at least partially overlap with the tailgate at the closed position; and
a controller configured to:
detect a reverse operation of the refuse vehicle;
cause the first camera to capture a first image during the reverse operation when the tailgate is at the closed position;
cause the second camera to capture a second image during the reverse operation when the tailgate is at a fully open position; and
as the tailgate transitions between the fully open position and the closed position:
cause both the first camera to capture the first image and the second camera to capture the second image.

2. The refuse vehicle of claim 1, wherein, during the reverse operation and when the tailgate is at one or more partially open positions between the closed position and the fully open position, the controller is configured to:

generate a third image from the first image and the second image.

3. The refuse vehicle of claim 2, wherein, during the reverse operation, the controller is configured to maintain a substantially fixed field of view of the third image as the tailgate transitions between the closed position and the fully open position.

4. The refuse vehicle of claim 1, further comprising a sensor configured to facilitate detecting a position of the tailgate.

5. The refuse vehicle of claim 1, wherein the first location is proximate a center of the tailgate.

6. The refuse vehicle of claim 1, wherein the second location is proximate a bottom of the tailgate.

7. The refuse vehicle of claim 1, wherein the controller is configured to deactivate the second camera during the reverse operation at least when the tailgate is at the closed position.

8. The refuse vehicle of claim 7, wherein the controller is configured to:

keep the second camera deactivated during the reverse operation when the tailgate is at a first partially open position that is less than an angle threshold; and activate the second camera during the reverse operation when the tailgate is at a second partially open position that is greater than the angle threshold.

9. The refuse vehicle of claim 8, wherein the angle threshold is at least 5 degrees.

10. The refuse vehicle of claim 1, wherein the controller is configured to deactivate the first camera during the reverse operation at least when the tailgate is at the fully open position.

11. A refuse vehicle system comprising:

a first camera configured to couple to a tailgate of a refuse vehicle and the first camera to be disposed at a first location of the tailgate to position the first camera to capture, with the tailgate at a closed position, a first field of view of a region behind the tailgate;

a second camera configured to couple to the tailgate and the second camera to be disposed at a second location, lower than the first location, to position the second camera to capture, with the tailgate at the closed position, a second field of view of the region behind the tailgate, wherein the first field of view and the second field of view at least partially overlay with the tailgate at the closed position; and a non-transitory computer-readable medium having instructions stored thereon that, when executed by one or more processors, cause the one or more processors to:

detect a reverse operation of the refuse vehicle;

cause (a) the first camera to capture a first image during the reverse operation when the tailgate is at the closed position and (b) the second camera to capture a second image during the reverse operation when the tailgate is at a fully open position; and as the tailgate transitions between the fully open position and the closed position:

cause both the first camera to capture the first image and the second camera to capture the second image.

12. The refuse vehicle system of claim 11, further comprising:

a body defining a refuse compartment; and the tailgate pivotably coupled to the body.

13. The refuse vehicle system of claim 12, wherein the first location is proximate a center of the tailgate.

14. The refuse vehicle system of claim 12, wherein the second location is proximate a bottom of the tailgate.

15. The refuse vehicle system of claim 11, wherein, during the reverse operation and when the tailgate is at one or more partially open positions between the closed position and the fully open position, the instructions cause the one or more processors to:

generate a third image from the first image and the second image.

16. The refuse vehicle system of claim 11, further comprising a sensor configured to facilitate detecting a position of the tailgate.

17. The refuse vehicle system of claim 11, wherein the instructions cause the one or more processors to deactivate the second camera during the reverse operation at least when the tailgate is at the closed position.

18. The refuse vehicle system of claim 17, wherein the instructions cause the one or more processors to:

keep the second camera deactivated during the reverse operation when the tailgate is at a first partially open position that is less than an angle threshold; and activate the second camera during the reverse operation when the tailgate is at a second partially open position that is greater than the angle threshold.

19. The refuse vehicle system of claim 11, wherein the instructions cause the one or more processors to deactivate the first camera during the reverse operation at least when the tailgate is at the fully open position.

20. A refuse vehicle comprising:

a chassis;

a body coupled to the chassis, the body defining a refuse compartment;

a tailgate pivotally coupled to the body at a rear of the refuse compartment;

a first camera coupled to the tailgate at a first location;

a second camera coupled to the tailgate at a second location lower than the first location; and a controller configured to:

activate the first camera to acquire first image data during a reverse operation of the refuse vehicle when the tailgate is at a closed position;

generate an image for display based on the first image data;

as the tailgate transitions from the closed position to a fully open position:

activate the second camera to acquire second image data during the reverse operation as the tailgate is pivoting open from the closed position; and generate the image based on the first image data and the second image data; and responsive to completion of transitioning from the closed position to the fully open position:

deactivate the first camera during the reverse operation at least when the tailgate reaches the fully open position; and generate the image based on only the second image data when the first camera is deactivated.

* * * * *